United States Patent [19]

Parker et al.

[11] Patent Number: 5,576,981
[45] Date of Patent: Nov. 19, 1996

[54] PORTABLE COMPUTER WITH INTERCHANGEABLE KEYPAD AND METHOD FOR OPERATING SAME

[75] Inventors: Wm. B. Parker, Mukilteo; Robert Y. Chen, Everett; Charles E. McCall, Bothell, all of Wash.

[73] Assignee: Intermec Corporation, Everett, Wash.

[21] Appl. No.: 153,461

[22] Filed: Nov. 17, 1993

[51] Int. Cl.$^6$ .................................................. G06F 3/02
[52] U.S. Cl. ................... 364/709.1; 364/209.15; 364/709.16
[58] Field of Search ................ 364/709.1, 709.15, 364/709.16

[56] References Cited

U.S. PATENT DOCUMENTS

| Re. 32,040 | 11/1985 | Bagley | 364/709.15 |
|---|---|---|---|
| 4,038,535 | 7/1977 | Aldridge et al. | 364/708.1 |
| 4,099,246 | 7/1978 | Osborne et al. | 364/709.16 |
| 4,280,121 | 7/1981 | Crask | 364/709.15 |
| 5,150,118 | 9/1992 | Finkle et al. | 364/709.1 |
| 5,181,029 | 1/1993 | Kim | 364/709.1 |
| 5,237,487 | 8/1993 | Dittmer et al. | 364/709.1 |
| 5,410,141 | 11/1995 | Koenck et al. | 364/709.1 |

*Primary Examiner*—David H. Malzahn
*Attorney, Agent, or Firm*—Seed and Berry LLP

[57] ABSTRACT

A portable bar code reader including a keyboard and a bar code system computer wherein the bar code system computer is constructed for executing a standard operating system to enable the bar code system computer to execute standard application programs written for the standard operating system. The keyboard includes a keypad coupled to a keyboard processor and a keyboard memory wherein the keyboard memory is constructed to store a plurality of token data units. The keypad includes a plurality of keys and is constructed to provide a plurality of X-Y position signals wherein each X-Y position signal is indicative of an associated key being depressed. The keypad also includes a change meaning assembly constructed to provide a change meaning signal to the keyboard processor 308. The keyboard processor 308 is responsive to the change meaning signal to select a portion of the keyboard memory that stores the meanings of the keys associated with the change meaning signal. The plurality of X-Y position signals are used to select a particular token data unit from the portion of the keyboard memory selected wherein the particular token data unit is indicative of the meaning to be attributed to the key that was depressed. The portable bar code reader of the present invention enables a user to provide differing keyboard formats for use with the bar code reader wherein each keyboard format assigns differing meanings to the keys. Alternatively, a plurality of keyboards may be used with the portable bar code reader wherein each keyboard is assigned differing meanings to the keys.

15 Claims, 5 Drawing Sheets

PORTABLE COMPUTER WITH INTERCHANGEABLE KEYPAD AND METHOD FOR OPERATING SAME

TECHNICAL FIELD

The present invention relates generally to an interchangeable keyboard assembly for use with a computer system and, more particularly, to a method and apparatus for redefining the meaning attributed to keys of a keyboard to thereby enable a plurality of keyboard formats and/or a plurality of keyboards to be used with a single computing system. The present invention further relates to a method and apparatus for assigning a plurality of meanings to keys for any given keyboard format.

BACKGROUND OF THE INVENTION

Bar code readers employing light transmitting and light sensitive devices for reading bar codes have become well known. These devices are typically constructed to store information relating to the bar codes that have been read and, at a later time, to download the stored information to an external computer for processing. As one example, portable bar code readers have been used by department and grocery stores to inventory products on the shelf. In this example, stationery bar code readers have been located at the checkout stand for reading the bar codes of products as they are purchased. The stationery bar code readers are permanently coupled to a bar code computer system that maintains the inventory information. Portable bar code readers are used by store clerks to record the number of items on the shelves by reading the bar codes. The portable bar code readers include data ports, or other similar connectors, for enabling the portable bar code readers to be coupled to the bar code computer system for transferring the stored information to the bar code computer system. Other examples of uses for portable bar code readers are for packaged delivery tracking, file management and storage, etc.

Recently, it has become desirable to provide portable bar code readers that include the bar code computer system so that the portable bar code reader is capable of performing data analysis in addition to data storage. Such a system has been shown and described in U.S. patent application Ser. No. 07/978,938, filed Nov. 17, 1992, for METHOD AND COMPUTER SYSTEM FOR DATA ENTRY OF BAR CODE SYMBOLS, by Paul A. Bolme et al. ("the Bolme et al. patent"), the disclosure of which is incorporated herein, in its entirety, by the foregoing reference thereto. The advantage of constructing a portable bar code reader with a self-contained bar code system is that a user is permitted to perform analysis on the data as it is collected, thereby improving the overall efficiency of the user's data tracking process. As described in the Bolme et al. patent, the bar code computer system contained in the portable bar code reader is constructed to run a standard DOS operating system. The advantage of having a DOS-based computer system is that the portable bar code reader can be used to run commercially available data processing programs that are constructed for the DOS operating system. Examples of such programs include Microsoft Access, Lotus 1-2-3, D-Base, etc.

As a further improvement to this system, it is desirable to provide a method for altering the meaning attributed to the keys of the portable bar code reader keyboard. Such capability would permit differing users of the same portable bar code reader to provide custom keyboard formats, i.e., custom definitions of the keys, thereby to improve the personal efficiency of the various users. However, prior art operating systems, including the DOS operating system discussed above, and the protocols for interfacing a keyboard with those systems, do not provide sufficient flexibility to enable significant reassignment of key meaning in a manner that is fully compatible with the hardware. Accordingly, it is desirable to provide a keyboard and method of interfacing the keyboard with standard operating systems to enable a user to provide custom keyboard formats by reassigning the meanings of the keys of the keyboard.

Furthermore, it is desirable to provide a plurality of keyboards for use with a single portable bar code reader, to improve the efficiency of use when the meaning of the keys are reassigned. In such a system, each user has a personal keyboard for use with the portable bar code reader. The keys of the personal keyboard are marked to identify the meanings attributed to those keys when the keyboard is used with the portable bar code reader. However, as discussed above, commonly available operating systems, and their protocols for interfacing a keyboard with the operating system, do not permit substantial reassignment of the meanings of the keys. Conversely, prior art operating systems and the protocols for interfacing a keyboard with those operating systems require substantially similar meanings be attributed to the keys of the various keyboards. Accordingly, it is desirable to provide a portable bar code reader for operation with a commonly available operating system wherein a variety of keyboards can be used with the bar code reader and wherein the meanings of the keys of the variety of keyboards can be easily reassigned.

SUMMARY OF THE INVENTION

The present invention is directed toward an improved keyboard for use by a user. The improved keyboard includes a keypad for providing a plurality of X-Y data signals in response to depression of a plurality of keys, wherein each of the plurality of X-Y data signals is associated with a respective one of the plurality of keys. The keyboard also includes a key meaning assembly for providing a change meaning signal wherein the change meaning signal includes first and second states. A token memory is also provided for storing a plurality of first token data units and a plurality of second token data units wherein each of the plurality of first token data units is associated with a corresponding one of the plurality of keys and wherein each of the plurality of second token data units is also associated with a corresponding one of the plurality of keys. The keyboard further includes a keyboard processor that is responsive to a received one of the plurality of X-Y data signals and the change meaning signal for obtaining a desired token data signal wherein the desired token data signal is indicative of the meaning to be attributed to the one of the plurality of keys corresponding to the one of the plurality of X-Y data signals. The first state of the change meaning signal indicates that the desired token data unit is one of the plurality of first token data units and the second state of the change meaning signal indicates that the desired token data unit is one of the plurality of second token data units. The received one of the plurality of X-Y data signal indicates the corresponding one of the plurality of first and second token data units.

In addition, a method for determining the meaning to be attributed to a plurality of keys of a keyboard is disclosed and claimed. The method may be implemented with a keyboard of the type that provides an X-Y data signal to indicate which of the plurality of keys has been selected by a user. The method includes the steps of providing a change meaning signal wherein the change meaning signal includes first and second states, storing a plurality of first token data units and a plurality of second token data units wherein each of the plurality of first token data units is associated with a corresponding one of the plurality of keys and wherein each of the plurality of second token data units is associated with a corresponding one of the plurality of keys, and responding to the X-Y data signal and the change meaning signal for obtaining a desired token data signal. The desired token data signal is indicative of the meaning to be attributed to the one of the plurality of keys corresponding to the received one of the plurality of X-Y data signals. The first state of the change meaning signal indicates that the desired token data unit is one of the plurality of first token data units. The second state of the change meaning signal indicates that the desired token data unit is one of the plurality of second token data units. The received one of the plurality of X-Y data signals indicates which of the plurality of first and second token data units correspond to the one of the plurality of keys depressed by the user.

DETAILED DESCRIPTION OF THE INVENTION

Figure 1:
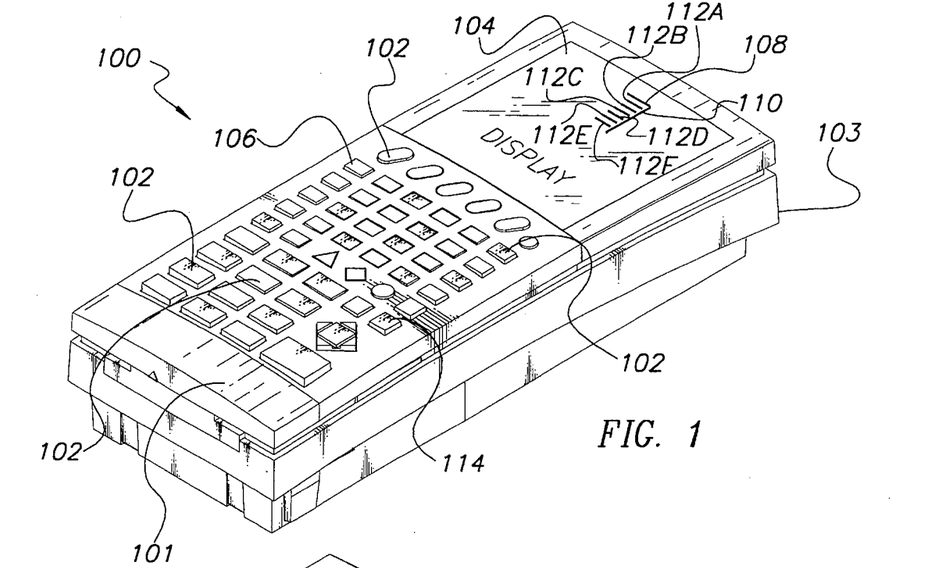
FIG. 1 is an illustration of a portable bar code reader constructed in accordance with the method and apparatus that is the subject of the present invention.

A portable bar code reader 100, illustrated in FIG. 1, is constructed to include a bar code system computer so that the portable bar code reader 100 is capable of performing data analysis in addition to data storage. Such a portable bar code reader, including a bar code system computer, has been shown and described in U.S. patent application Ser. No. 07/978,938, filed Nov. 17, 1992, for METHOD AND COMPUTER SYSTEM FOR DATA ENTRY OF BAR CODE SYMBOLS by Paul A. Bolme et al. ("the Bolme et al. patent"), the disclosure of which is incorporated herein, in its entirety, by the foregoing reference thereto.

The portable bar code reader 100 includes a keyboard 101 having a plurality of keys 102 for enabling a user to provide input to the portable bar code reader 100. Each of the plurality of keys 102 transmits information having a preselected meaning to the bar code reader 100 when depressed by the user. As is known in the art, the user can depress a plurality of key combinations to provide various information to the bar code reader 100.

The keyboard 101 is mounted in a keyboard housing 103 along with a display 104. The display 104 is constructed for providing information from the bar code reader 100 to the user of the bar code reader. The display 104 may be any conventional electronic apparatus for displaying information to a user. As examples, the display may comprise a plurality of light-emitting diodes ("LEDs"), a liquid crystal display, etc. Many other options for the display 104 will readily become apparent to those skilled in the art.

In accordance with the subject invention, the portable bar code reader 100 is constructed to enable a user to define a plurality of keyboard formats. As used herein, the term "keyboard format" refers to the meaning that is attributed to the plurality of keys 102. As an example, in a first format, a key 106 may represent a "1" and, therefore, transmit a programatic representation of "1" to the bar code reader 100 when depressed. In a second format, the same key 106 may represent a "4" and transmit a programatic representation of "4" to the bar code reader 100 when depressed.

The bar code reader 100 includes a unique meaning indicator 108 (sometimes referred to as an ICON). The meaning indicator 108 includes an elongated indicator 110 and a plurality of meaning indicators 112-A through 112-F. The plurality of meaning indicators 112-A through 112-F are positioned in orthogonal relationship with respect to the elongated indicator 110 as illustrated in FIG. 1. The plurality of meaning indicators 112-A through 112-F are constructed to be selectively actuatable so that only a single meaning indicator 112-A through 112-F is actuated at any time. The particular meaning indicator 112-A through 112-F that is actuated provides an indication to the user of the keyboard format that is being used, i.e., the meanings that are being attributed to the plurality of keys 102.

In one presently preferred embodiment of the invention, a meaning key 114 is provided on the keypad 101 for changing the keyboard format. The meaning key 114 includes a legend that matches the meaning indicator 108. By depressing the meaning key 114, the user can change the keyboard format from a first format to a second format. As discussed above, this change is indicated by actuating one of the meaning indicators 112-A through 112-F. In accordance with the present invention, a plurality of keyboard formats can be provided so that the meaning key 114 can be repeatedly depressed until the desired format is selected as indicated by the meaning indicator 108.

Figures 2A, 2B:
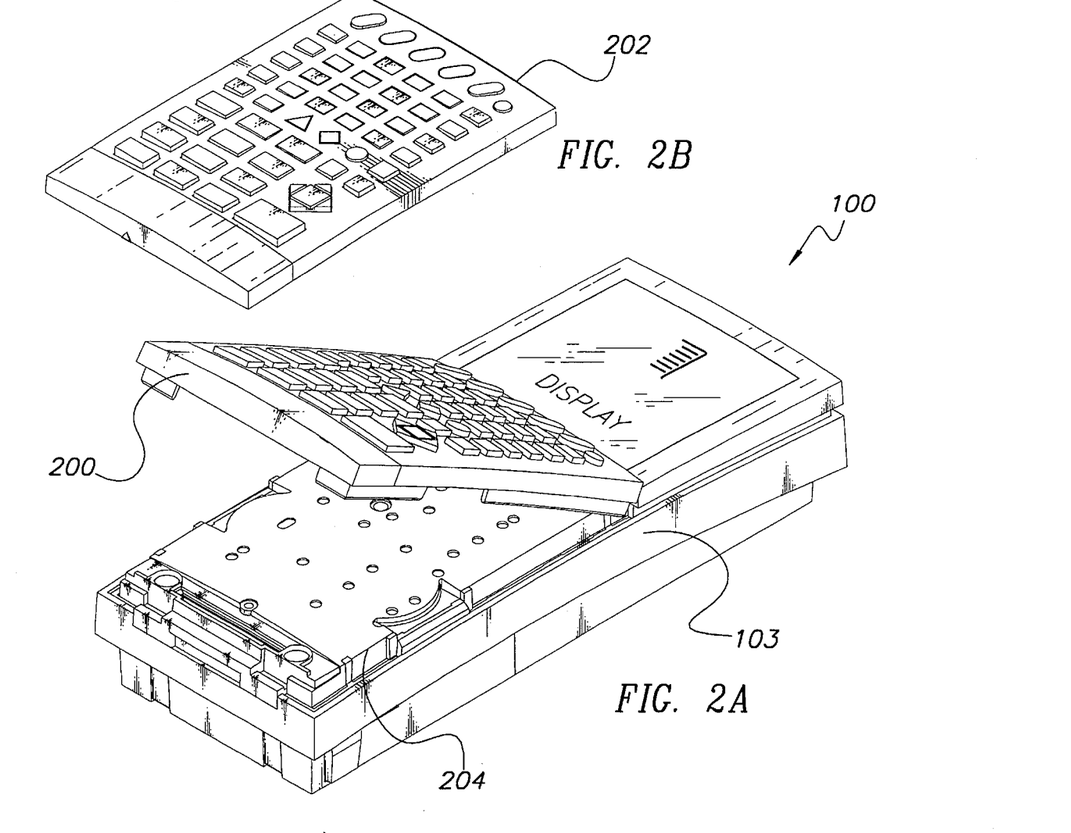
FIGS. 2A and 2B are illustrations of the portable bar code reader of FIG. 1 further illustrating its use with a plurality of keyboards.

In an alternative embodiment of the invention, the portable bar code reader 100 is constructed to be used with a replaceable keypad 200, as illustrated in FIG. 2A. A second keypad 202 (FIG. 2B) may be substituted for the first keypad 200. Each of the first and second keypads 200 and 202 are constructed to be removeably couplable to the keyboard housing 103 to construct a keyboard 204. Furthermore, each of the first and second keypads 200 and 202 includes apparatus for providing a keypad identification signal to the portable bar code reader 100. Those skilled in the art will readily appreciate that a plurality of electrical and/or mechanical means for providing an indication to the portable bar code reader as to which keypad is coupled to the keyboard housing 103 may be provided. In a presently preferred embodiment of the invention, the first and second keypads 200 and 202 include a keypad terminal for transmitting signals from the keypad to the portable bar code reader 100. Among the signals transmitted is a signal indicating the identification of the keypad coupled to the bar code reader housing 103.

Figure 3:
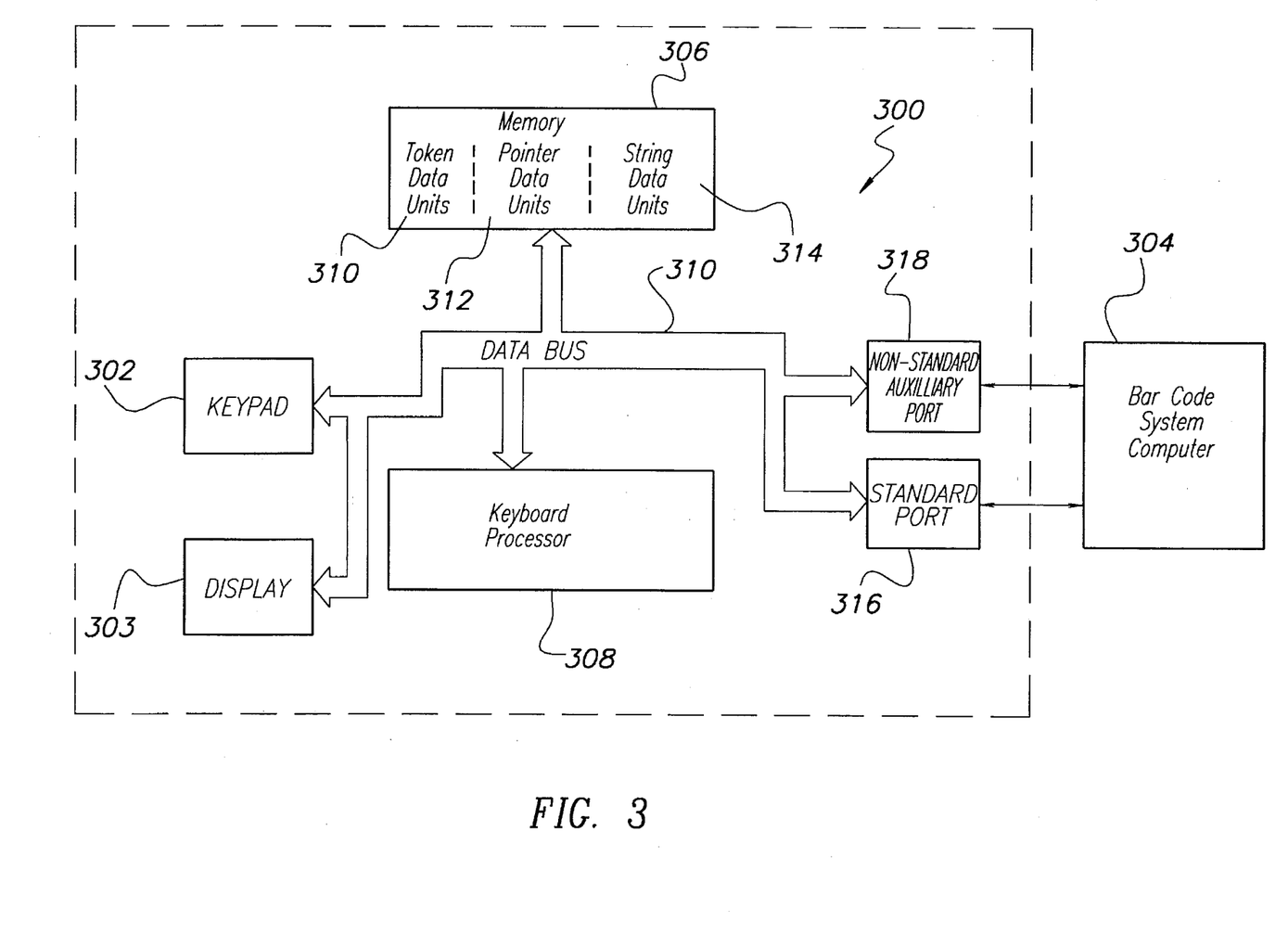
FIG. 3 is a schematic illustration of apparatus that is the subject of the present invention.

Referring to the schematic diagram of FIG. 3, a more detailed description of the construction and operation of the portable keyboard 100 will be provided. The portable bar code reader 100 includes a keyboard 300 having a keypad 302 and display 303 coupled thereto. The display 303 may comprise the same elements, or group of elements, as discussed above by reference to FIG. 1. The keypad 302 may comprise separate physical devices, such as keypads 200 and 202 of FIGS. 2A and 2B, that are physically couplable to the bar code housing 103 (FIG. 1), as discussed above, and electrically couplable to the remainder of the keyboard 300 (FIG. 3). Alternatively, the keypad 302 may be constructed as an integral part of the keyboard 300.

The keypad 302 is constructed to provide a plurality of X-Y position signals in response to depression of the plurality of keys 102 (FIG. 1). As is known in the art, each of the plurality of X-Y position signals is associated with a respective one of the plurality of keys 102. The plurality of X-Y position signals are provided to a keyboard processor 308 via a data bus 310. In addition, the keypad 302 provides a meaning signal to the keyboard processor 308 over the data bus 310. The meaning signal may be provided by depressing the meaning key 114 (FIG. 1), discussed above. Additionally, the meaning signal may be provided as a result of depressing the meaning key 114 and providing the keypad identification signal, discussed above by reference to keypads 200 and 202 of FIGS. 2A and 2B. Other apparatus and methods for providing the meaning signal will readily become apparent to those skilled in the art.

The keyboard 300 is connected for transmitting electrical signals to and from a bar code system computer 304. As discussed briefly above, the bar code system computer comprises a conventional computer system constructed for operation in accordance with a conventional operating system. In accordance with a presently preferred embodiment of the invention, the bar code computer system 304 is constructed for operation in accordance with the MS-DOS operating system by Microsoft Corporation. However, those skilled in the art will appreciate that the bar code system computer 304 could be constructed for operation in accordance with any conventional operating system without departing from the present invention.

An advantage to constructing the bar code system computer 304 to operate in accordance with a conventional operating system is that the bar code system computer 304 is capable of executing instructions from conventional computer programs written for the conventional operating system. Examples of conventional computer programs that could be executed by the bar code system computer of the subject invention include Microsoft Access, Lotus 1-2-3, D-Base, etc. Those skilled in the art will appreciate that other conventional computer programs could be executed on the bar code system computer 304 in addition to those discussed above. Furthermore, when constructed to operate in accordance with a different conventional operating system, different conventional computer programs can be executed by the bar code system computer 304.

The keyboard 300 further includes the keyboard memory 306 constructed for communication with the keyboard processor 308 over the data bus 310. The keyboard memory 306 may be considered to include three memory portions, a token memory 310, a pointer memory 312, and a string memory 314. Those skilled in the art will appreciate that although the token memory 310, pointer memory 312, and string memory 314 are each illustrated in FIG. 3 as in integral part of the keyboard memory 306, that each of the token memory 310, pointer memory 312, or string memory 314 may comprise separate electrical elements.

Figure 4:
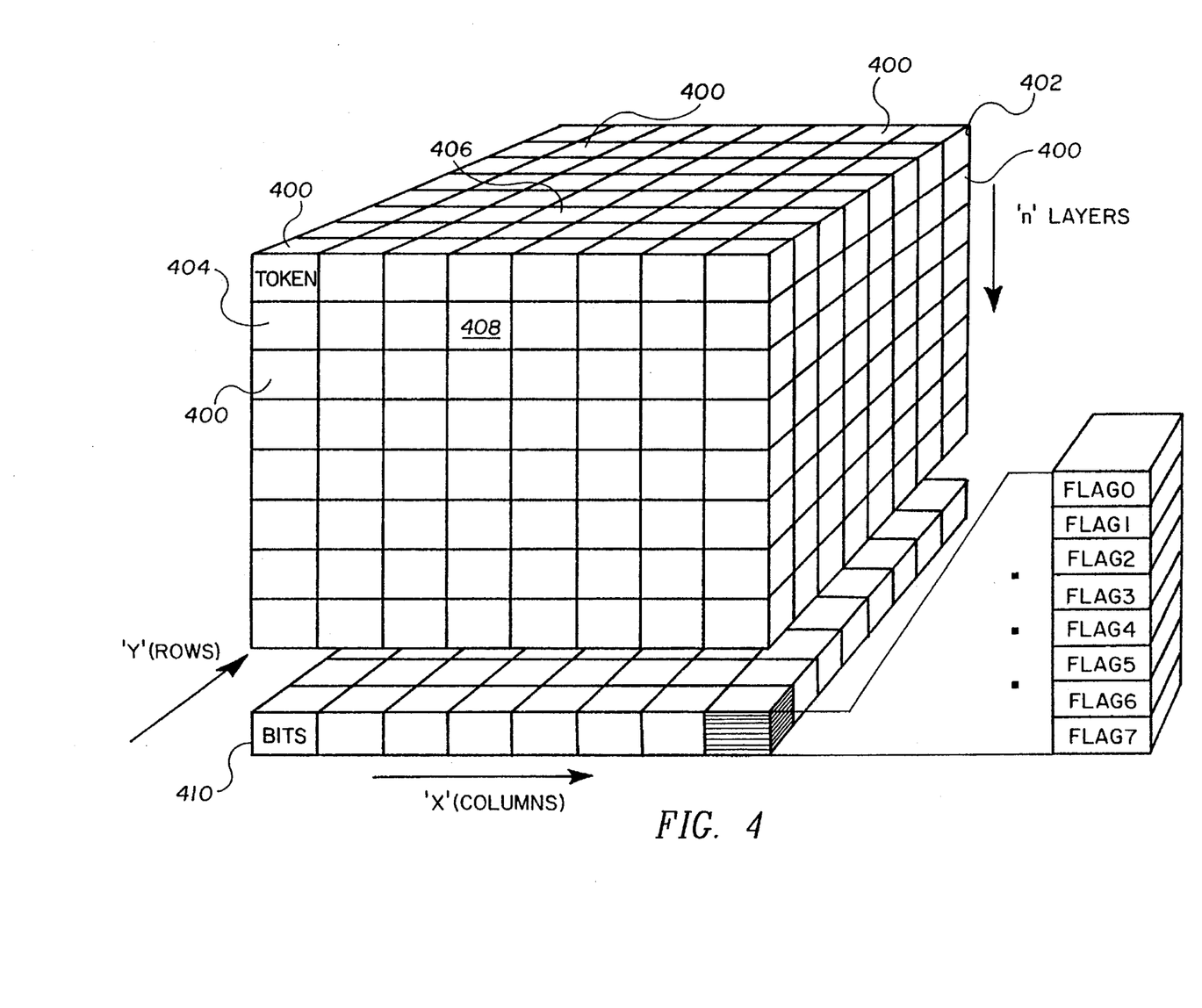
FIG. 4 is a diagram used to illustrate a method of storing data to permit the portable bar code reader to be used with differing keyboard formats and/or differing keyboards.

The token memory 310 is constructed to include a plurality of first memory locations and a plurality of second memory locations, illustrated diagramatically in FIG. 4. Those skilled in the art will appreciate, however, that the diagram of FIG. 4 is provided only for purposes of illustration and that the data stored in the token memory 310 may be stored in any conventional manner.

Referring to FIG. 4, the data stored in the token memory is comprised of a plurality of token data units 400. Each token data unit 400 is associated with a predetermined one of the plurality of X-Y position signals generated by the keypad 302 and is associated with a predetermined keyboard format, as will be discussed in more detail below. Each token data unit 400 represents a meaning that will be attributed to an associated key when a format is selected. To illustrate the manner in which the X-Y position signals are used in combination with the meaning signal to select a particular meaning for a particular key, the token data units are shown arranged in a cube having a width of X columns, a depth of Y rows, and a height of n layers. A plurality of first memory locations 402 is illustrated as the first layer of the cube; a plurality of second memory locations 404 is illustrated as the second layer of the cube, and so on. Each layer of the cube illustrated in FIG. 4 represents a keyboard format having token data units for identifying the meanings attributed to the plurality of keys 102 of the keypad 101 (FIG. 1) when that format is selected.

The plurality of X-Y position signals are used to locate any of the plurality of token data units by a conventional indexing scheme, i.e., if X=4 and Y=3, then a token data unit 406 of the first layer is selected. The change meaning signal is used to identify which keyboard format, i.e., which layer of the cube illustrated in FIG. 4 is to be selected. Accordingly, if the change meaning signal indicates that the first plurality of memory locations 402 is selected, then a value of X=4 and Y=3 for the X-Y position signal will identify the token data unit 406. Conversely, if the change meaning signal indicates that the second plurality of memory locations is selected, then a value of X=4 and Y=1 will identify a token data unit 408.

The token memory 400 may further include a third plurality of memory locations 410 for providing additional information regarding the keyboard format. Accordingly, in addition to the X-Y position signals and the change meaning signal identifying a particular token data unit, these signals may also identify a particular bit, or bits, of the third plurality of memory locations 410. Again, the X-Y position signals are used to indicate a particular control data unit, as discussed above, and the change meaning signal is used to indicate a control signal, or signals, to be selected from the indicated control data unit stored in the identified memory location. The control signal is a bit that may be used as a flag, as illustrated in FIG. 4. Other applications for this control signal will readily become apparent to those skilled in the art.

Returning to FIG. 3, the pointer memory 312 is constructed for storing a plurality of pointer data units and the string memory 314 is constructed for storing a plurality of string data units. The pointer memory 312 and string memory 314 are used to convert the token data units identified by the X-Y position signals and the change meaning signal into desired string data that is transmitted to the bar code system computer 304. In accordance with the present invention, the desired string data may be a string of data of various lengths to permit the meaning to be assigned to specific keys to be fairly complex. As an example, the desired string data that is transmitted to the bar system computer 304 in response to depression of a single key may be string data that identifies a particular user by name, the string data being in the form of operating system standard codes. As another example, the desired string data that is transmitted to the bar code system computer 304 in response to depression of a single key may be data to identify a predetermined bar code. Other examples of string data that may be transmitted to the bar code system computer 304 in response to depression of a single key will become apparent to those skilled in the art.

Figure 6:
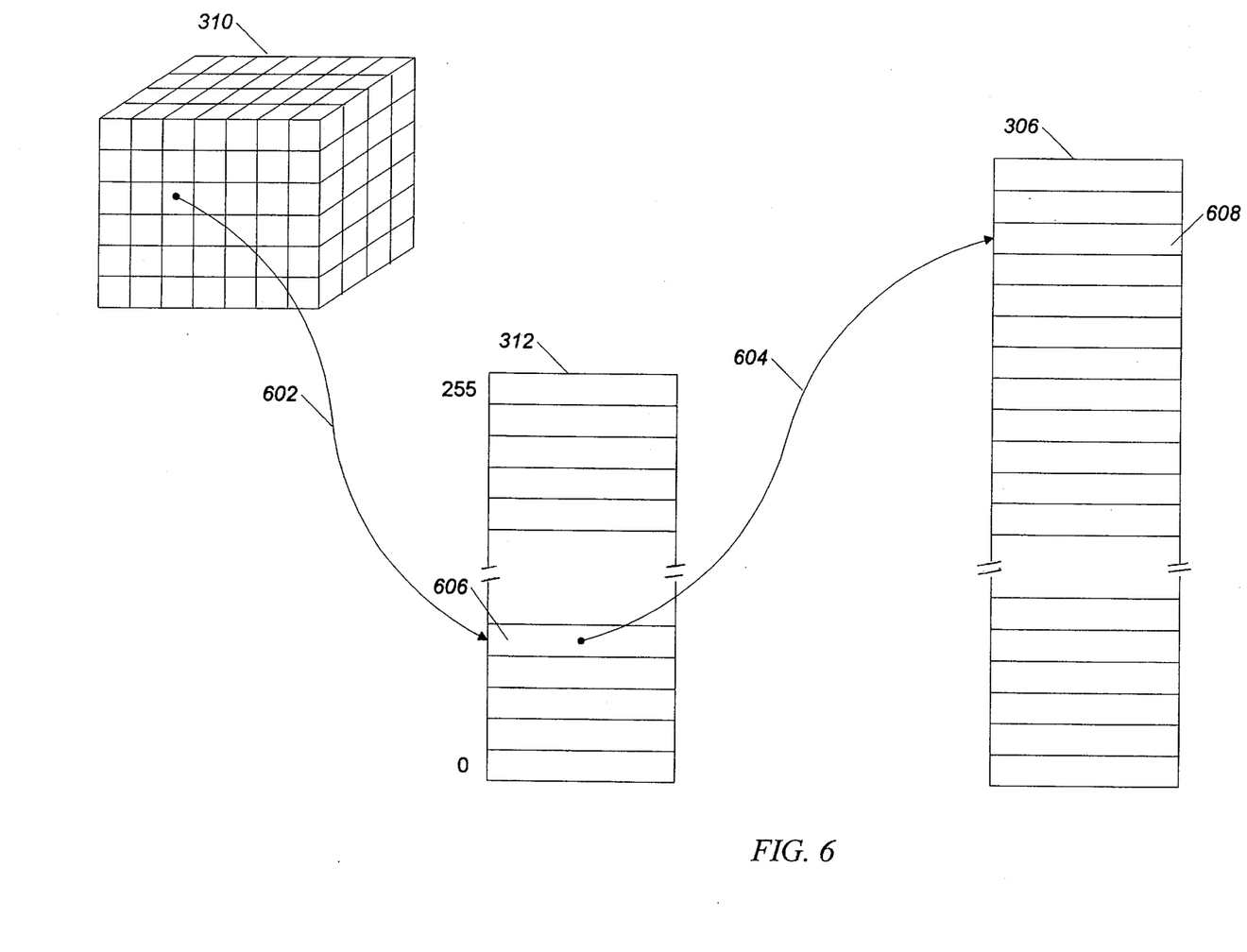
FIG. 6 is a diagram illustrating the association between the token memory, the pointer memory, and the string memory in accordance with a preferred embodiment of the present invention.

In the preferred embodiment, the token data units stored in the token memory 310 consist of 8 bits of data, thereby limiting the number of memory locations that can be addressed to two hundred and fifty-six (i.e., $2^8=256$). By utilizing the pointer memory 312, the number of memory locations that any token data unit may address is substantially increased. FIG. 6 is a diagram illustrating the association between the token memory 310, the pointer memory 312, and the string memory 306. The token memory 310 contains a pointer 602, which points to entry 606 in the pointer memory 312. The entry 606 contains a pointer 604 to an entry 608 in the string memory 306. The entry 608 in the string memory 306 may contain a variable-length string.

In a presently preferred embodiment of the invention, the desired string data that is retrieved from the string memory in response to depression of a single key may be string data that instructs the keyboard processor 308 to perform a particular function. The function may be entirely internal to the keyboard processor 308, may be internal to the keyboard 300, or may be performed in combination with information transmitted to and/or received from the bar code system computer 304. One example of a function that may be performed by the keyboard processor 308 is a function performed in response to depression of the change meaning key 114 (FIG. 1). When the change meaning key 114 is depressed, a desired string data will instruct the keyboard processor 308 to cause one of the plurality of meaning indicators of 112-A through 112-F to be deactivated and to cause another of the plurality of meaning indicators to be activated. Other examples of functions to be performed by the keyboard processor 308 in response to the desired string data that is retrieved after depression of a key will readily become apparent to those skilled in the art.

In operation, the keyboard processor 308 is constructed for receiving the plurality of X-Y position signals from the keypad 302 and for providing the desired string data to a standard keyboard port 316, for communication with the bar code system computer 304. The keyboard processor 308 is responsive to the X-Y position signal to access corresponding ones of the plurality of first memory locations 402 (FIG. 4) and the plurality of third memory locations of the token memory 310, as described above. The keyboard processor 308 is responsive to the change meaning signal for determining whether to access the plurality of first memory locations and whether to access the plurality of second memory locations, also as discussed above. The keyboard processor 308 is also responsive to the X-Y position signal to access a corresponding one of the plurality of third memory locations 410 to retrieve a desired control data unit and is responsive to the change meaning signal for obtaining a desired control signal wherein the control signal is a portion of the desired control data unit. As discussed above, by reference to FIG. 4, the desired control signal of a presently preferred embodiment of the invention comprises a single bit of the stored control data.

In a presently preferred embodiment of the invention, the token memory 310 is constructed for operation with a keyboard processor 308 wherein the keyboard processor 308 is constructed for operating upon a predetermined number of bits (e.g., 8). Since the token data units stored in the token memory 310 may comprise data to be operated upon by the keyboard processor 308, the token data units stored in the token memory must be 8 bits or less. However, as discussed above, it is desirable to provide information of various data lengths to the bar code system computer 304. Accordingly, the pointer memory 312 and string memory 314 enable the keyboard processor 308 to increase the amount of data that is provided to the bar code system computer 304 in response to depression of a single key.

The standard keyboard port 316 is coupled to the data bus 310 for receiving the desired string data from the string data memory 314. The standard keyboard port 316 is also coupled to the bar code system computer 304 for transmitting the desired string data unit to the bar code system computer 304, as is known in the art. It is important to note that the standard keyboard port 316 is constructed to operate in accordance with the protocol employed by a conventional keyboard. Therefore, the information transmitted to the bar code system computer 304 is in standard form and is recognizable by the standard operating system that is being executed by the bar code system computer 304.

Figure 5:
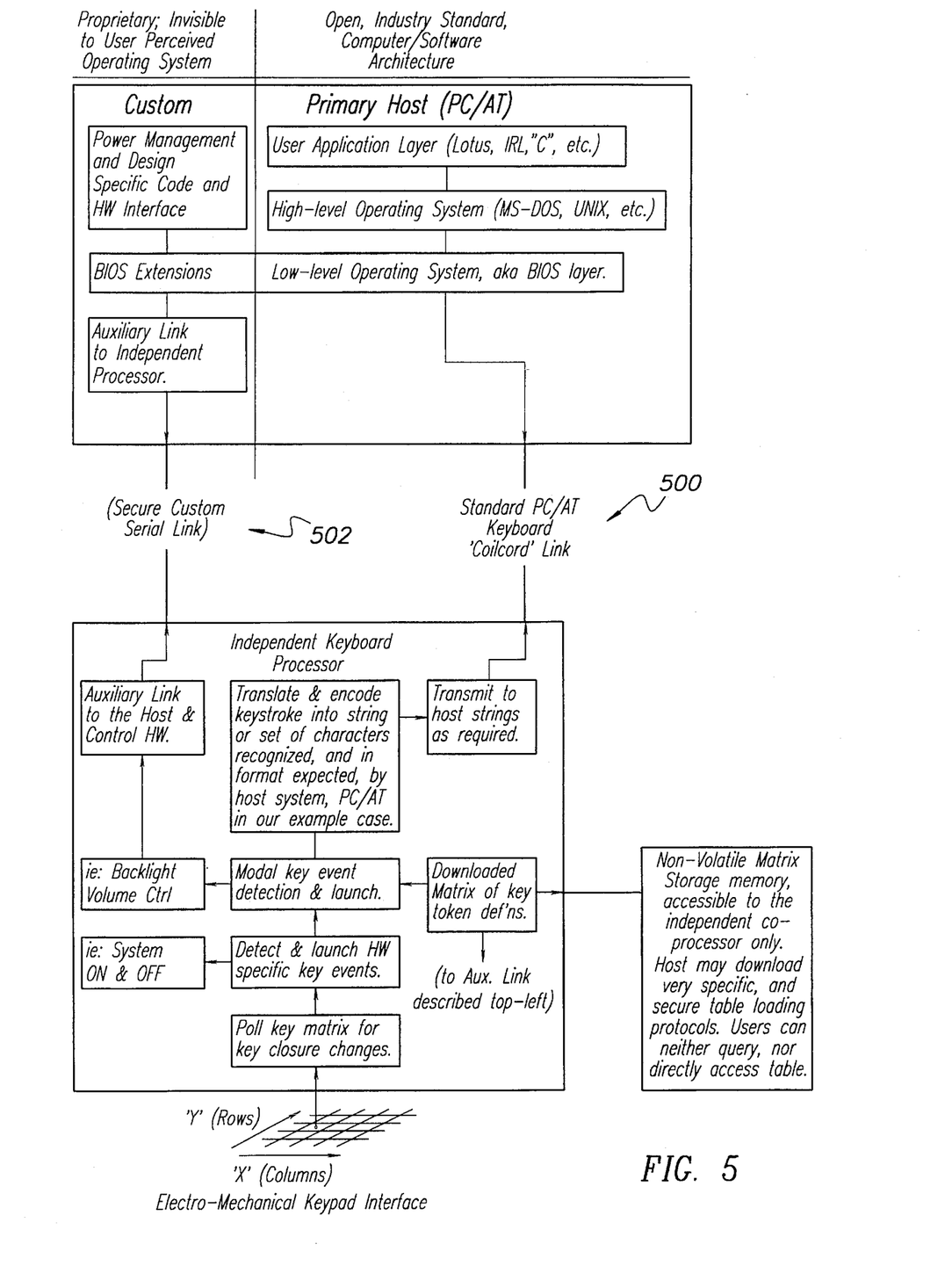
FIG. 5 is a diagram illustrating the interaction between the keyboard and the conventional system computer of the portable bar code reader.

In addition to the standard keyboard port 316, an additional keyboard port 318 is coupled intermediate the bar code system computer 304 and the data bus 310. The additional keyboard port is a custom keyboard port constructed for tranceiving additional data transmitted between the keyboard processor 308 and the bar code system computer 304. The additional data may include token data units and/or desired data strings. In addition, the additional data may include a change meaning signal or other function data. A diagram illustrating the communication between the bar code system computer 304 and the keyboard 300 is illustrated in FIG. 5.

Therein, the communication via the standard keyboard port 316 is illustrated at 500. The communication between the keyboard processor 308 and the bar code system computer 304 over the additional keyboard port 318 is illustrated at 502. The bar code system computer 304 is shown to be an industry standard computer/software architecture such as, for example, a PC/AT. As illustrated in FIG. 5, the bar code system computer 304 is constructed for executing standard user applications on a standard high level operating system via a low level operating system such as a BIOS layer. The bar code system computer 304 also includes custom BIOS extensions that enable the bar code system computer 304 to communicate with the keyboard processor 308 over the additional data port 318. The BIOS extensions interact with custom power management codes, design-specific codes, and a custom hardware interface to create an auxiliary link to the keyboard processor 308. This auxiliary link, over the additional port 318, can be used to transmit a plurality of data between the bar code system computer 304 and the keyboard processor 308, as discussed above. The custom power management codes, design-specific codes, and custom hardware that compose the auxiliary link may be readily provided by those skilled in the art after a selection of the standard computer/software architecture, i.e., after selecting the BIOS layer and operating system.

From the foregoing it will be appreciated that, although specific embodiments of the invention have been described herein for purposes of illustration, various modifications may be made without deviating from the spirit and scope of the invention. Accordingly, the invention is not limited except as by the appended claims.

We claim:

1. A data processing assembly for a user comprising:

a system computer constructed for operation in accordance with a standard operating system;

a keyboard housing;

a keypad mounted to said keyboard housing, said keypad having a plurality of keys for depression by a user, said keypad being constructed to provide a plurality of X-Y position signals in response to depression of said plurality of keys wherein each of said plurality of X-Y position signals is associated with a respective one of said plurality of keys, said keypad further including a meaning key and being constructed to provide a change meaning signal in response to depression of said meaning key by the user;

a token memory mounted in said keyboard housing, said token memory having a plurality of first memory locations and a plurality of second memory locations wherein each of said plurality of first memory locations is associated with a corresponding one of said plurality of second memory locations, said plurality of first and second memory locations of said token memory being constructed for storing a plurality of token data units, said token memory further including a plurality of third memory locations wherein each of said plurality of third memory locations is associated with respective ones of said plurality of first and second memory locations, said plurality of third memory locations being constructed for storing a plurality of control data units;

a pointer memory mounted in said keyboard housing, said pointer memory being constructed for storing a plurality of pointer data units;

a string memory mounted in said keyboard housing, said string memory being constructed for storing a plurality of string data units;

a keyboard processor mounted in said keyboard housing and being electrically coupled to said keypad, said token memory, said pointer memory and said string memory, said keyboard processor being responsive to said plurality of X-Y position signals to access corresponding ones of said plurality of first memory locations and said plurality of second memory locations of said token memory, said keyboard processor being responsive to said change meaning signal for determining whether to access said plurality of first memory locations and whether to access said plurality of second memory locations, said keyboard processor retrieving a desired token data unit from said token memory, said keyboard processor being responsive to said desired token data unit for retrieving a desired pointer data unit from said pointer memory and being responsive to said desired pointer data unit for retrieving a desired string data unit from said string memory, wherein said desired string data unit identifies a meaning that will be attributed to a particular one of said plurality of keys, the meaning being a function of said change meaning signal, said keyboard processor being further responsive to said X-Y position signals to access a corresponding one of said plurality of third memory locations to access a desired control data unit and being responsive to said change meaning signal for obtaining a desired control signal wherein said control signal is portion of said desired control data unit;

a standard keyboard port mounted in said keyboard housing, said standard keyboard port being coupled to said keyboard processor for receiving said desired string data unit, said standard keyboard port being coupled to said system computer for transmitting said desired string data unit to said system computer;

an additional keyboard port mounted in said keyboard housing and electrically coupled to said keyboard processor, said additional keyboard port further being coupled to said system computer constructed for interfacing said keyboard processor with said system computer in co-existence with said standard operating system in a manner such that the standard operating system is not interfered with and is furthermore unaware of the additional port, thereby to transmit and receive additional data to and from said system computer wherein said additional data includes token data units and desired data strings; and a display mounted in said keyboard housing and electrically coupled to said keyboard processor, said display including a meaning indicator having a elongated indicator and first and second meaning indicators wherein said first and second meaning indicators are light responsive devices that are selectively actuatable, said first and second meaning indicators being positioned in orthogonal relationship with respect to said elongated indicator, said keyboard processor being responsive to said change meaning signal for selectively actuating said first and second meaning indicators thereby to indicate to the user the meaning that will be attributed to said plurality of keys of said keypad.

2. A data processing assembly for a user comprising:

a system computer constructed to operate in accordance with a standard operating system;

a keyboard housing;

keypad means, mounted to said keyboard housing, for providing a plurality of X-Y data signals, said keypad means having a plurality of keys for depression by a user, said keypad means being constructed to provide said plurality of X-Y data signals in response to depression of said plurality of keys wherein each of said plurality of X-Y data signals is associated with a respective one of said plurality of keys;

meaning means for providing a change meaning signal associated with at least one of said plurality of keys;

a token memory mounted in said keyboard housing, said token memory having a plurality of first memory locations and a plurality of second memory locations wherein each of said plurality of first memory locations is associated with a corresponding one of said plurality of second memory locations and wherein each of said plurality of first and second memory locations is associated with a corresponding one of said plurality of keys, said plurality of first and second memory locations of said token memory being constructed for storing a plurality of token data units;

a string memory mounted in said keyboard housing, said string memory being constructed for storing a plurality of string data units;

a keyboard processor mounted in said keyboard housing and being electrically coupled to said keypad, said token memory and said string memory, said keyboard processor being responsive to said plurality of X-Y position signals to access corresponding ones of said plurality of first memory locations and said plurality of second memory locations of said token memory, said keyboard processor being responsive to said change meaning signal for determining whether to access said plurality of first memory locations and whether to access said plurality of second memory locations, said keyboard processor retrieving a desired token data unit from said token memory, said keyboard processor being responsive to said desired token data unit for retrieving a desired string data unit from said string memory, wherein said desired string data unit identifies a meaning that will be attributed to a particular one of said plurality of keys, the meaning being a function of said change meaning signal; and a standard keyboard port mounted in said keyboard housing, said standard keyboard port being coupled to said keyboard processor for receiving said desired string data unit, said standard keyboard port being coupled to said system computer for transmitting said desired string data unit to said computer system.

3. The data processing assembly as recited in claim 2 wherein at least a portion of said plurality of string data units comprise standard data units recognizable by said system computer in accordance with said standard operating system.

4. The data processing assembly as recited in claim 2 wherein said token data includes function data and system data and wherein said token memory further comprises a plurality of third memory locations wherein each of said plurality of third memory locations is associated with respective ones of said plurality of first and second memory locations, said plurality of third memory locations being constructed for storing a plurality of control data units, said keyboard processor being further responsive to said X-Y position signals to access a corresponding one of said plurality of third memory locations to retrieve a desired control data unit and being responsive to said change meaning signal for obtaining a desired control signal wherein said control signal is portion of said desired control data unit, said keyboard processor being responsive to said control data for determining whether said desired token data unit represents function data and, if so, for performing the function represented, said keyboard processor being responsive to said control data for determining whether said desired token data unit represents system data and, if so, for retrieving and transmitting said desired string data unit to said system computer.

5. The data processing assembly as recited in claim 2 further comprising:

a display mounted in said keyboard housing and electrically coupled to said keyboard processor, said display including first and second meaning indicators that are selectively activated by said keyboard processor in response to said change meaning signal to indicate to the user the meaning that will be attributed to said plurality of keys of said keypad.

6. The data processing assembly as recited in claim 2 further comprising:

a display mounted in said keyboard housing and programatically coupled to said keyboard processor, said display including a meaning indicator having an elongated indicator and first and second meaning indicators wherein said first and second meaning indicators are reflectivity controlling devices that are selectively actuatable, said first and second meaning indicators being positioned in orthogonal relationship with respect to said elongated indicator, said keyboard processor being responsive to said change meaning signal for selectively actuating said first and second meaning indicators thereby to indicate to the user the meaning that will be attributed to said plurality of keys of said keypad.

7. The data processing assembly as recited in claim 2 wherein said meaning means comprises a meaning key mounted to said keypad means wherein said meaning key is constructed to provide said change meaning signal in response to depression of said meaning key by the user.

8. The data processing assembly as recited in claim 2 wherein said keypad means comprises first and second keypads each being removeably couplable to said keyboard housing, each said first and second keypads including means for providing an identification signal, said meaning means being responsive to said identification signal for providing said meaning signal.

9. The data processing assembly as recited in claim 2 further comprising an additional keyboard port mounted in said keyboard housing and electrically coupled to said keyboard processor, said additional keyboard port further being coupled to said system computer for interfacing said keyboard processor with said system computer in accordance with said standard operating system, thereby to permit transmission and reception of additional data to and from said system computer in accordance with said standard operating system wherein said additional data includes token data units, desired data strings, and non-standard system requests.

10. The data processing assembly as recited in claim 9 wherein said meaning means is responsive said additional data for providing said change meaning signal.

11. A keyboard subsystem for use by a user with a host computer that has a standard computer operating system, the keyboard subsystem comprising:

a keypad including a plurality of keys to provide a plurality of X-Y data signals in response to a depression of said plurality of keys wherein each of said plurality of X-Y data signals is associated with a respective one of said plurality of keys;

meaning means for providing a change meaning signal associated with at least one of said plurality of keys wherein said change meaning signal includes first and second states;

a token memory having a plurality of first memory locations to store a plurality of first token data units and a plurality of second memory locations to store a plurality of second token data units wherein each of said plurality of first token data units is associated with a corresponding one of said plurality of keys and wherein each of said plurality of second token data units is associated with a corresponding one of said plurality of keys wherein said plurality of first and second token data units include function data and system data and wherein said token memory further comprises a plurality of third memory locations wherein each of said plurality of third memory locations is associated with respective ones of said plurality of first and second memory locations, said plurality of third memory locations being constructed for storing a plurality of control data units;

a keyboard processor responsive to a received one of said plurality of X-Y data signals and said change meaning signal to obtain a desired token data signal wherein said desired token data unit is indicative of the meaning to be attributed to the one of said plurality of keys corresponding to the received one of said plurality of X-Y data signals, said first state of said change meaning signal indicating that said desired token data unit is one of said plurality of first token data units and said second state of said change meaning signal indicating that said desired token data unit is one of said plurality of second token data units, the received one of said plurality of X-Y data signals indicating the corresponding one of said plurality of first and second token data units, said keyboard processor being further responsive to said X-Y position signals and said change meaning signal to retrieve a desired control data unit, said keyboard processor being responsive to said desired control data unit for determining whether said desired token data unit represents function data and, if so, for performing the function represented, said keyboard processor being responsive to said desired control data unit for determining whether said desired token data unit represents system data and, if so, for retrieving and transmitting said desired token data unit to said system computer; and a keyboard port coupling the keyboard with the host computer, said keyboard port transmitting string data corresponding to said desired token data unit to the host computer in a format recognizable by the computer operating system.

12. A keyboard subsystem for use by a user with a host computer that has a standard computer operating system, the keyboard subsystem comprising:

a keypad including a plurality of keys to provide a plurality of X-Y data signals in response to a depression of said plurality of keys wherein each of said plurality of X-Y data signals is associated with a respective one of said plurality of keys;

meaning means for providing a change meaning signal associated with at least one of said plurality of keys wherein said change meaning signal includes first and second states;

a token memory to store a plurality of first token data units and a plurality of second token data units wherein each of said plurality of first token data units is associated with a corresponding one of said plurality of keys and wherein each of said plurality of second token data units is associated with a corresponding one of said plurality of keys;

a keyboard processor responsive to a received one of said plurality of X-Y data signals and said change meaning signal to obtain a desired token data signal wherein said desired token data unit is indicative of the meaning to be attributed to the one of said plurality of keys corresponding to the received one of said plurality of X-Y data signals, said first state of said change meaning signal indicating that said desired token data unit is one of said plurality of first token data units and said second state of said change meaning signal indicating that said desired token data unit is one of said plurality of second token data units, the received one of said plurality of X-Y data signals indicating the corresponding one of said plurality of first and second token data units;

a display having first and second meaning indicators wherein said first and second meaning indicators are light emitting devices that are selectively actuatable, said keyboard processor being responsive to said change meaning signal for selectively actuating said first and second meaning indicators thereby to indicate to the user the meaning that will be attributed to said plurality of keys of said keypad means, said display further including an elongated light emitting device and wherein said first and second meaning indicators are positioned in orthogonal relationship with respect to said elongated light emitting device to form a ladder like arrangement; and a keyboard port coupling the keyboard with the host computer, said keyboard port transmitting string data corresponding to said desired token data unit to the host computer in a format recognizable by the computer operating system.

13. A keyboard subsystem for use by a user with a host computer that has a standard computer operating system, the keyboard subsystem comprising:

a keypad including a plurality of keys to provide a plurality of X-Y data signals in response to a depression of said plurality of keys wherein each of said plurality of X-Y data signals is associated with a respective one of said plurality of keys;

meaning means for providing a change meaning signal associated with at least one of said plurality of keys wherein said change meaning signal includes first and second states;

a token memory to store a plurality of first token data units and a plurality of second token data units wherein each of said plurality of first token data units is associated with a corresponding one of said plurality of keys and wherein each of said plurality of second token data units is associated with a corresponding one of said plurality of keys;

a keyboard processor responsive to a received one of said plurality of X-Y data signals and said change meaning signal to obtain a desired token data signal wherein said desired token data unit is indicative of the meaning to be attributed to the one of said plurality of keys corresponding to the received one of said plurality of X-Y data signals, said first state of said change meaning signal indicating that said desired token data unit is one of said plurality of first token data units and said second state of said change meaning signal indicating that said desired token data unit is one of said plurality of second token data units, the received one of said plurality of X-Y data signals indicating the corresponding one of said plurality of first and second token data units;

a display having first and second meaning indicators wherein said first and second meaning indicators are light emitting devices that are selectively actuatable, said keyboard processor being responsive to said change meaning signal for selectively actuating said first and second meaning indicators thereby to indicate to the user the meaning that will be attributed to said plurality of keys of said keypad means, said display further including an elongated reflectivity controlling device and wherein said first and second meaning indicators are positioned in orthogonal relationship with respect to said elongated light emitting device to form a ladder like arrangement; and a keyboard port coupling the keyboard with the host computer, said keyboard port transmitting string data corresponding to said desired token data unit to the host computer in a format recognizable by the computer operating system.

14. A data processing apparatus for communicating with a host computer, the host computer using a standard computer operating system, the apparatus comprising:

a keyboard housing;

a keypad mounted to said housing and containing a plurality of keys operable by a user;

a change signal generator within the host computer to produce and to transmit a change signal to the apparatus to automatically select first and second functions for a particular one of said plurality of keys;

a token memory within said keyboard housing and having a plurality of locations corresponding to said plurality of keys, said token memory being responsive to said change signal and selection of said particular key to address a first token memory location in response to said selection of said particular key when said first function is selected and a second token memory location in response to said selection of said particular key when said second function is selected;

a string memory storing a plurality of string data units corresponding to the standard computer operating system, said string memory being responsive to said addressing of said first and second token memory locations to select a first string data unit in response to said addressing of said first token memory location and a second string data unit in response to said addressing of said second token memory location; and a keyboard port coupling the apparatus with the host computer and transmitting string data units to the host computer, said keyboard transmitting said first string data unit in response to said selection of said first string data unit and said second string data unit in response to said addressing of said selection of said second string data unit.

15. A method for use with a keyboard to communicate with a host computer, the host computer using a standard computer operating system, the method comprising the steps of:

sensing user selection of one of a plurality of keys mounted on the keyboard;

transmitting a change meaning signal having first and second signal states from the host computer to the keyboard;

in response to user selection of said one key and said change meaning signal state, selecting a first token memory location in a token memory if said change meaning signal is in said first state and selecting a second token memory location in said token memory if said change meaning signal is in said second state; and transmitting string data units to the host computer using a keyboard port coupling the keyboard with the host computer, said string data units corresponding to the standard computer operating system and recognizable by the standard computer operating system, said keyboard port transmitting a first string data unit in response to said selection of said first token memory location and said second string data unit in response to said addressing of said selection of said second string data unit.

* * * * *